US012603831B2

(12) United States Patent
Chen

(10) Patent No.: US 12,603,831 B2
(45) Date of Patent: Apr. 14, 2026

(54) BIT INDEX EXPLICIT REPLICATION FAST REROUTE

(71) Applicant: Huawei Technologies Co., Ltd., Shenzhen (CN)

(72) Inventor: Huaimo Chen, Bolton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 361 days.

(21) Appl. No.: 18/305,157

(22) Filed: Apr. 21, 2023

(65) Prior Publication Data

US 2024/0356835 A1      Oct. 24, 2024

Related U.S. Application Data

(63) Continuation of application No. PCT/US2021/054599, filed on Oct. 12, 2021.

(60) Provisional application No. 63/104,985, filed on Oct. 23, 2020.

(51) Int. Cl.
| | |
|---|---|
| *H04L 12/66* | (2006.01) |
| *H04L 45/00* | (2022.01) |
| *H04L 45/02* | (2022.01) |
| *H04L 45/18* | (2022.01) |

(52) U.S. Cl.
CPC .............. *H04L 45/22* (2013.01); *H04L 45/02* (2013.01); *H04L 45/18* (2013.01)

(58) Field of Classification Search
CPC ......... H04L 45/16; H04L 45/54; H04L 45/74; H04L 45/04; H04L 12/185; H04L 61/5069; H04L 45/22; H04L 45/34; H04L 12/18; H04L 65/611; H04L 47/806; H04L 45/24
See application file for complete search history.

(56) References Cited

U.S. PATENT DOCUMENTS

| | | | | |
|---|---|---|---|---|
| 9,485,135 B1 * | 11/2016 | Sarkar | ...................... | H04L 45/28 |
| 2015/0131658 A1 * | 5/2015 | Wijnands | ............ | H04L 45/7453 |
| | | | | 370/392 |
| 2015/0131659 A1 * | 5/2015 | Wijnands | ................ | H04L 45/16 |
| | | | | 370/392 |
| 2015/0131660 A1 * | 5/2015 | Shepherd | ................ | H04L 45/74 |
| | | | | 370/390 |
| 2015/0138961 A1 * | 5/2015 | Wijnands | ............ | H04L 12/1863 |
| | | | | 370/228 |
| 2015/0181309 A1 * | 6/2015 | Shepherd | ......... | H04N 21/64322 |
| | | | | 725/109 |

(Continued)

OTHER PUBLICATIONS

Atlas, A., Ed. and A. Zinin, Ed., "Basic Specification for IP Fast Reroute: Loop-Free Alternates", RFC 5286, DOI 10.17487/RFC5286, Sep. 2008, <https://www.rfc-editor.org/info/rfc5286>.

(Continued)

*Primary Examiner* — Kharye Pope
(74) *Attorney, Agent, or Firm* — Conley Rose, P.C.

(57) ABSTRACT

A method implemented by a network node in a Bit Index Explicit Replication (BIER) domain is used to provide fast reroute protection. The method includes copying a bit index routing table (BIRT) of the network node, changing a neighbor node in the copied BIRT to one of a plurality of backup neighbor nodes to generate a backup BIRT, deriving a backup bit index forwarding table (BIFT) from the backup BIRT, and forwarding a packet in accordance with the backup BIFT when the neighbor node has failed.

21 Claims, 5 Drawing Sheets

(56)             References Cited

U.S. PATENT DOCUMENTS

| | | | | |
|---|---|---|---|---|
| 2018/0278522 | A1* | 9/2018 | Asati | H04L 45/64 |
| 2020/0344162 | A1* | 10/2020 | Dutta | H04L 45/745 |
| 2021/0306251 | A1* | 9/2021 | Mahadevan | H04L 49/201 |

OTHER PUBLICATIONS

Berger, L., Bryskin, I., Zinin, A., and R. Coltun, "The OSPF Opaque LSA Option", RFC 5250, DOI 10.17487/RFC5250, Jul. 2008, <https://www.rfc-editor.org/info/rfc5250>.

Bradner, S., "Key words for use in RFCs to Indicate Requirement Levels", BCP 14, RFC 2119, DOI 10.17487/ RFC2119, Mar. 1997, <https://www.rfc-editor.org/info/rfc2119>.

Bryant, S., Filsfils, C., Previdi, S., Shand, M., and N. So, "Remote Loop-Free Alternate (LFA) Fast Reroute (FRR)", RFC 7490, DOI 10.17487/RFC7490, Apr. 2015, <https://www.rfc-editor.org/info/rfc7490>.

Chen, et al., "BIER Egress Protection," draft-chen-bier-egress-protect-02, Aug. 26, 2021, 21 pages.

Ginsberg, L., Previdi, S., and Y. Yang, "IS-IS Flooding Scope Link State PDUs (LSPs)", RFC 7356, DOI 10.17487/RFC7356, Sep. 2014, <https://www.rfc-editor.org/info/rfc7356>.

Hegde, S., Bowers, C., Litkowski, S., Xu, X., and F. Xu, "Segment Protection for SR-TE Paths", draft-ietf-spring-segment-protection-sr-te-paths-00, Sep. 2020.

Katz, D. and D. Ward, "Bidirectional Forwarding Detection (BFD)", RFC 5880, DOI 10.17487/RFC5880, Jun. 2010, <https://www.rfc-editor.org/info/rfc5880>.

Leiba, B., "Ambiguity of Uppercase vs Lowercase in RFC 2119 Key Words", BCP 14, RFC 8174, DOI 10.17487/RFC8174, May 2017, <https://www.rfc-editor.org/info/rfc8174>.

Lindem, A., Ed., Shen, N., Vasseur, JP., Aggarwal, R., and S. Shaffer, "Extensions to OSPF for Advertising Optional Router Capabilities", RFC 7770, DOI 10.17487/RFC7770, Feb. 2016, <https://www.rfc-editor.org/info/rfc7770>.

Litkowski, S., Bashandy, A., Filsfils, C., Decraene, B., Francois, P., Voyer, D., Clad, F., and P. Camarillo, "Topology Independent Fast Reroute using Segment Routing", draft-ietf-rtgwg-segment-routing-ti-lfa-04, Aug. 2020.

Narten, T. and H. Alvestrand, "Guidelines for Writing an IANA Considerations Section in RFCs", RFC 5226, DOI 10.17487/ RFC5226, May 2008, <https://www.rfc-editor.org/info/rfc5226>.

Psenak, P., Gredler, H., Shakir, R., Henderickx, W., Tantsura, J., and A. Lindem, "OSPFv2 Prefix/Link Attribute Advertisement", RFC 7684, DOI 10.17487/RFC7684, Nov. 2015, <https://www.rfc-editor.org/info/rfc7684>.

Rosen, E., Ed., Sivakumar, M., Przygienda, T., Aldrin, S., and A. Dolganow, "Multicast VPN Using Bit Index Explicit Replication (BIER)", RFC 8556, DOI 10.17487/RFC8556, Apr. 2019, <https://www.rfc-editor.org/info/rfc8556>.

Shand, M. and S. Bryant, "IP Fast Reroute Framework", RFC 5714, DOI 10.17487/RFC5714, Jan. 2010, <https://www.rfc-editor.org/info/rfc5714>, 15 pages.

Wijnands, Ed., et al., "Multicast Using Bit Index Explicit Replication," draft-ietf-bier-architecture-02, Jul. 29, 2015, 36 pages.

Wijnands, IJ., Ed., Rosen, E., Ed., Dolganow, A., Przygienda, T., and S. Aldrin, "Multicast Using Bit Index Explicit Replication (BIER)", RFC 8279, DOI 10.17487/RFC8279, Nov. 2017, <https://www.rfc-editor.org/info/rfc8279>.

\* cited by examiner

100

200

| BFR-id (SI:BitString) 202 | BFR-Prefix of Dest BFER 204 | BFR-NBR (Next Hop) 206 |
|---|---|---|
| 1 (0:00001) | D | C |
| 2 (0:00010) | F | C |
| 3 (0:00100) | E | E |
| 4 (0:01000) | H | C |
| 5 (0:10001) | A | A |

| BFR-id (SI:BitString) 302 | F-BM 304 | BFR-NBR (Next Hop) 306 |
|---|---|---|
| 1 (0:00001) | 01011 | C |
| 2 (0:00010) | 01011 | C |
| 3 (0:00100) | 00100 | E |
| 4 (0:01000) | 01011 | C |
| 5 (0:10000) | 10000 | A |

| | BFR-id (SI:BitString) | BFR-Prefix of Dest BFER | BFR-NBR (Next Hop) |
|---|---|---|---|
| | 402 | 404 | 406 |
| 408 | 1 (0:00001) | D | G |
| 410 | 2 (0:00010) | F | E |
| 412 | 3 (0:00100) | E | E |
| 414 | 4 (0:01000) | H | G |
| 416 | 5 (0:10001) | A | A |

| | BFR-id (SI:BitString) | F-BM | BFR-NBR (Next Hop) |
|---|---|---|---|
| | 502 | 504 | 506 |
| 508 | 1 (0:00001) | 01001 | G |
| 510 | 2 (0:00010) | 00110 | E |
| 512 | 3 (0:00100) | 00110 | E |
| 514 | 4 (0:01000) | 01001 | G |
| 516 | 5 (0:10000) | 10000 | A |

Copy a bit index routing table (BIRT) of the network node ⟋ 602

Change a neighbor node in the copied BIRT to one of a plurality of backup neighbor nodes to generate a backup BIRT ⟋ 604

Derive a backup bit index forwarding table (BIFT) from the backup BIRT ⟋ 606

Forward a packet in accordance with the backup BIFT when the neighbor node has failed ⟋ 608

700

BIT INDEX EXPLICIT REPLICATION FAST REROUTE

CROSS-REFERENCE TO RELATED APPLICATIONS

This patent application is a continuation of International Application No. PCT/US2021/054599 filed on Oct. 12, 2021, by Futurewei Technologies, Inc., and titled "Bit Index Explicit Replication Fast Reroute," which claims the benefit of U.S. Provisional Patent Application No. 63/104,985 filed Oct. 23, 2020 by Futurewei Technologies, Inc., and titled "Bit Index Explicit Replication Fast Reroute," which is hereby incorporated by reference.

TECHNICAL FIELD

The present disclosure is generally related to the field of fast re-route (FRR) protection and, in particular, to FRR protection against the failure of a node in a Bit Index Explicit Replication (BIER) domain.

BACKGROUND

BIER mechanisms provide optimized forwarding of multicast data packets through a BIER domain. BIER domains may not require the use of a protocol for explicitly building multicast distribution trees. Further, BIER domains may not require intermediate nodes to maintain any per-flow state. BIER is described in further detail in Internet Engineering Task Force (IETF) document Request for Comments (RFC) 8279 entitled "Multicast Using Bit Index Explicit Replication (BIER)" by I J. Wijnands, et al., published November 2017.

SUMMARY

The disclosed aspects/embodiments provide a fast reroute procedure for a BIER domain. To facilitate the fast reroute procedure, a bit index routing table (BIRT) of a network node is copied to generate a backup BIRT for a neighbor node. The neighbor node in the backup is replaced with one of a plurality of backup neighbor nodes when the neighbor node is a next hop for a destination network node in the backup BIRT. A backup bit index forwarding table (BIFT) is derived from the backup BIRT. Packets are then forwarded in accordance with the backup BIFT when the neighbor node has failed. The fast reroute procedure is also able to utilize a loop-free alternate (LFA) to reduce redundant packets. Therefore, packet routing within the BIER domain is improved.

A first aspect relates to method implemented by a network node in a Bit Index Explicit Replication (BIER) domain, comprising: copying a bit index routing table (BIRT) of the network node; changing a neighbor node in the copied BIRT to one of a plurality of backup neighbor nodes to generate a backup BIRT; deriving a backup bit index forwarding table (BIFT) from the backup BIRT; and forwarding a packet in accordance with the backup BIFT when the neighbor node has failed.

Optionally, in any of the preceding aspects, another implementation of the aspect provides that the one of a plurality of backup neighbor nodes for the destination network node is a basic loop-free alternate (LFA) bit forwarding router (BFR) for the destination network node.

Optionally, in any of the preceding aspects, another implementation of the aspect provides that the one of a plurality of backup neighbor nodes for the destination network node is a remote loop-free alternate (LFA) bit forwarding router (BFR) for the destination network node.

Optionally, in any of the preceding aspects, another implementation of the aspect provides that the one of a plurality of backup neighbor nodes for the destination network node is a topology independent loop-free alternate (LFA) bit forwarding router (BFR) for the destination network node.

Optionally, in any of the preceding aspects, another implementation of the aspect provides deriving the backup BIFT comprises generating a forwarding bit mask (F-BM) for each destination network node in the backup BIFT using a bitstring of each destination BFR from the backup BIRT.

Optionally, in any of the preceding aspects, another implementation of the aspect provides deriving the backup BIFT comprises generating a forwarding bit mask (F-BM) for two or more of the destination network nodes sharing a same next hop in the backup BIRT by applying a logical OR operation to bitstrings of the two or more destination network nodes.

Optionally, in any of the preceding aspects, another implementation of the aspect provides that a forwarding bit mask (F-BM) in the backup BIFT is used when the packet is forwarded in accordance with the backup BIFT.

Optionally, in any of the preceding aspects, another implementation of the aspect provides detecting that the neighbor node has failed after the backup BIFT has been derived.

Optionally, in any of the preceding aspects, another implementation of the aspect provides that the destination network node in the backup BIRT is represented by a bit forwarding router identifier (BFR-id), a set index, and a bitstring.

Optionally, in any of the preceding aspects, another implementation of the aspect provides that the network node is a bit forwarding router (BFR), and wherein the neighbor node is a bit forwarding router neighbor (BFR-NBR).

Optionally, in any of the preceding aspects, another implementation of the aspect provides that the destination network node is a bit forwarding egress router (BFER).

A second aspect relates to network node in a Bit Index Explicit Replication (BIER) domain, comprising: a memory storing instructions; and one or more processors coupled to the memory, wherein the one or more processors are configured to execute the instructions to cause the network node to: copy a bit index routing table (BIRT) of the network node; change a neighbor node in the copied BIRT to one of a plurality of backup neighbor nodes to generate a backup BIRT; derive a backup bit index forwarding table (BIFT) from the backup BIRT; and forward a packet in accordance with the backup BIFT when the neighbor node has failed.

Optionally, in any of the preceding aspects, another implementation of the aspect provides that the one of a plurality of backup neighbor nodes for the destination network node is a basic loop-free alternate (LFA) bit forwarding router (BFR) for the destination network node.

Optionally, in any of the preceding aspects, another implementation of the aspect provides that the one of a plurality of backup neighbor nodes for the destination network node is a remote loop-free alternate (LFA) bit forwarding router (BFR) for the destination network node.

Optionally, in any of the preceding aspects, another implementation of the aspect provides that the one of a plurality of backup neighbor nodes for the destination network node is a topology independent loop-free alternate (LFA) bit forwarding router (BFR) for the destination network node.

Optionally, in any of the preceding aspects, another implementation of the aspect provides that to derive the backup BIFT the one or more processors are configured to execute the instructions to cause the network node to generate a forwarding bit mask (F-BM) for each destination network node in the backup BIFT using a bitstring of each destination BFR from the backup BIRT to derive the backup BIFT.

Optionally, in any of the preceding aspects, another implementation of the aspect provides that to derive the backup BIFT the one or more processors are configured to execute the instructions to cause the network node to generate a forwarding bit mask (F-BM) for two or more of the destination network nodes sharing a same next hop in the backup BIRT by applying a logical OR operation to bitstrings of the two or more destination network nodes.

Optionally, in any of the preceding aspects, another implementation of the aspect provides that the network node is a bit forwarding router (BFR) and the neighbor node is a bit forwarding router neighbor (BFR-NBR).

Optionally, in any of the preceding aspects, another implementation of the aspect provides that the destination network node is a bit forwarding egress router (BFER).

Optionally, in any of the preceding aspects, another implementation of the aspect provides that the one or more processors are configured to execute the instructions to cause the network node to detect that the neighbor node has failed after the backup BIFT has been derived.

Optionally, in any of the preceding aspects, another implementation of the aspect provides that the destination network node in the backup BIRT is represented by a bit forwarding router identifier (BFR-id), a set index, and a bitstring.

A third aspect relates to a network node in a Bit Index Explicit Replication (BIER) domain, comprising: copying means configured to copy a bit index routing table (BIRT) of the network node; copying means configured to copy the neighbor node in the copied BIRT to one of a plurality of backup neighbor nodes to generate a backup BIRT; deriving means configured to derive a backup bit index forwarding table (BIFT) from the backup BIRT; and forwarding means configured to forward a packet in accordance with the backup BIFT when the neighbor node has failed.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a schematic diagram of a bit index routing table (BIRT) of a network node.

FIG. 3 is a schematic diagram of a bit index forwarding table (BIFT) of a network node.

FIG. 4 is a schematic diagram of a fast reroute (FRR) BIRT of a network node according to an embodiment of the disclosure.

FIG. 5 is a schematic diagram of a FRR BIFT of a network node according to an embodiment of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

One technique that has been proposed to provide FRR in a BIER domain calls for a bit forwarding router (BFR) to route packets to a backup BFR using a routing underlay tunnel when a neighbor bit forwarding router (BFR-NBR) fails. However, this technique has drawbacks. First, the technique will not work unless the routing underlay tunnel has been established. In addition, the technique is unable to prevent redundant packets from being transmitted within the BIER domain.

Disclosed herein a fast reroute procedure for a BIER domain that overcomes one or more of the above-noted problems. To facilitate the fast reroute procedure, a bit index routing table (BIRT) of a network node is copied to generate a fast re-reroute (FRR)-BIRT (a.k.a., a backup BIRT) for a neighbor node. The neighbor node in the FRR-BIRT is replaced with one of a plurality of backup neighbor nodes when the neighbor node is a next hop for a destination network node in the FRR-BIRT. A FRR bit index forwarding table (FRR-BIFT) (a.k.a., a backup BIFT) is derived from the FRR-BIRT. Packets are then forwarded in accordance with the FRR-BIFT when the neighbor node has failed. The fast reroute procedure is also able to utilize a loop-free alternate (LFA) to reduce redundant packets. Therefore, packet routing within the BIER domain is improved.

Figure 1:
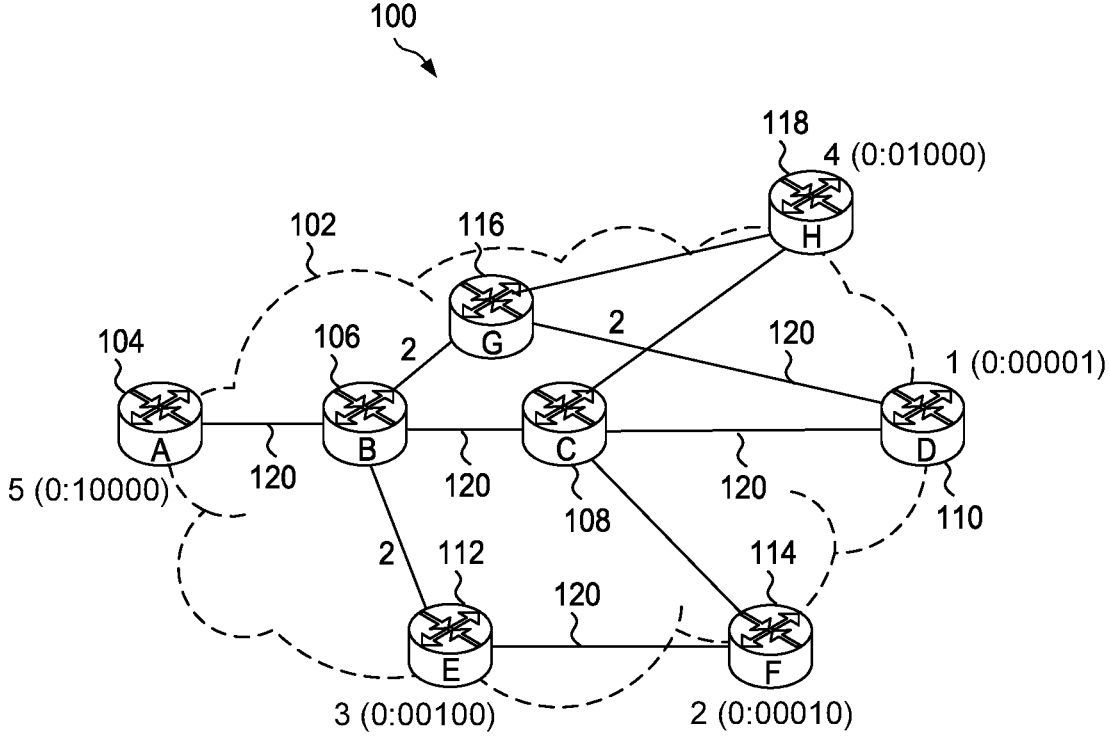
FIG. 1 is a schematic diagram of a BIER topology including a BIER domain.

FIG. 1 is a schematic diagram of a BIER topology 100 including a BIER domain 102. The BIER domain 102 may be part of a larger BIER domain (not shown). As such, the BIER domain 102 may be referred to herein as a BIER sub-domain. The BIER domain 102 comprises a plurality of network nodes 104, 106, 108, 110, 112, 114, 116, and 118. While eight network nodes 104-118 are shown in the BIER domain 102, more or fewer nodes may be included in practical applications.

For case of discussion, all of the network nodes 104-118 have been given a letter designation. For example, the network node 104 has the designation A, the network node 106 has the designation B, the network node 108 has the designation C, the network node 110 has the designation D, the network node 112 has the designation E, the network node 114 has the designation F, the network node 116 has the designation G, and the network node 118 has the designation H.

Each of the network nodes 104-118 is a bit forwarding router (BFR). Some of the network nodes, namely the network nodes 104, 110, 112, 114 and 118, are disposed at an edge of the BIER domain 102. The network nodes 104, 110, 112, 114 and 118 receiving multicast packets from outside the BIER domain 102 may be referred to as an ingress BFR (BFIR). The network nodes 104, 110, 112, 114 and 118 transmitting multicast packets out of the BIER domain 102 may be referred to as an egress BFR (BFER). Depending on the direction of multicast packet traffic, each of the network nodes 104-118 may function as a BFIR or a BFER.

Each of the network nodes 104, 110, 112, 114 and 118 may be referred to herein as a destination network node. The network nodes 104, 110, 112, 114 and 118 have each been assigned a BFR identifier (BFR-id), a set index (SI), and a bitstring. For example, the network node 110 has a BFR-id of 1, has a SI of 0, and has a bitstring of 00001 (collectively illustrated as 1 (0:00001) in FIG. 1). The network node 114 has a BFR-id of 2, has a SI of 0, and has a bitstring of 00010 (collectively illustrated as 2 (0:00010)). The network node 112 has a BFR-id of 3, has a SI of 0, and has a bitstring of 00100 (collectively illustrated as 3 (0:00100)). The network node 118 has a BFR-id of 4, has a SI of 0, and has a bitstring of 01000 (collectively illustrated as 4 (0:01000)). The network node 104 has a BFR-id of 5, has a SI of 0, and has a bitstring of 10000 (collectively illustrated as 5 (0:100000)).

Each of the network nodes 104-118 has one or more neighbor nodes. As used herein, a neighbor node refers to a network node that is only one hop away from the network node. For example, network node 106 has four neighbor nodes in FIG. 1, namely network node 104, network node 108, network node 112, and network node 116. Indeed, each of network node 104, network node 108, network node 112, and network node 116 are only one hop away from network node 106.

The network nodes 104-118 in FIG. 1 are coupled to, and communicate with each other, via links 120. The links 120 may be wired, wireless, or some combination thereof. Each of the links 120 have a cost. For example, the cost of the link between network node 106 and network node 112 is 2 as shown in FIG. 1. Likewise, the cost of the link between network node 106 and network node 116 is 2 and the cost of the link between network node 116 and network node 110 is also 2. For any link 120 in FIG. 1 not showing a numerical value next to the link, the default cost is 1. For example, the cost of the link between network node 106 and network node 104 is 1.

FIG. 2 is a schematic diagram of a bit index routing table (BIRT) 200 of a network node (e.g., network node 106). Each of the network nodes 104-118 in the BIER topology 100 in FIG. 1 builds and maintains a BIRT 200. The BIRT 200 may be built and maintained using, for example, a link state database (LSDB) that takes into account the cost of the links 120 between the network nodes.

The BIRT 200 depicted in FIG. 2 is the BIRT 200 built on the network node 106 in FIG. 1. As shown, the BIRT 200 includes three columns of information. A first column 202 includes the BFR-id of each destination network node in the BIER topology 100. A second column 204 includes the prefix associated with each destination network node (BFR-Prefix of Dest BFER). A third column 206 identifies the neighbor node (BFR-NBR) of the network node 106 used to reach the destination network node identified in the first column 202, which is why the neighbor node in the third column 206 may also be referred to as the next hop of the network node 106.

A first row 208 in the BIRT 200 indicates that the BFR-NBR (or next hop) on the shortest path to the destination node D (a.k.a., network node 110, or the network node with the BFR-id of 1) is network node C (a.k.a., network node 108). A second row 210 in the BIRT 200 indicates that the BFR-NBR on the shortest path to the destination node F (a.k.a., network node 114, or the network node with the BFR-id of 2) is network node C. A third row 212 in the BIRT 200 indicates that the BFR-NBR on the shortest path to the destination node E (a.k.a., network node 112, or the network node with the BFR-id of 3) is network node E. A fourth row 214 in the BIRT 200 indicates that the BFR-NBR on the shortest path to the destination node H (a.k.a., network node 118, or the network node with the BFR-id of 4) is network node C. A fifth row 216 in the BIRT 200 indicates that the BFR-NBR on the shortest path to the destination node A (a.k.a., network node 104, or the network node with the BFR-id of 5) is network node A. Notably, the destination network node in the first row 208, the second row 210, and the fourth row 214 in the BIRT 200 each have an SI of 0 and have the same BFR-NBR of network node C.

FIG. 3 is a schematic diagram of a bit index forwarding table (BIFT) 300 of a network node (e.g., network node 106). Each of the network nodes 104-118 in the BIER topology 100 in FIG. 1 derives a BIFT 300 based on the BIRT (e.g., BIRT 200) that the network nodes 104-118 built.

The BIFT 300 depicted in FIG. 3 is the BIFT 300 built on the network node 106 in FIG. 1. As shown, the BIFT 300 includes three columns of information. The first column 302 and the third column 306 in the BIFT 300 are the same as the first column 202 and the third column 206 in the BIRT 200 of FIG. 2. However, a second column 304 includes a forwarding bit mask (F-BM).

Because the destination network nodes with the BFR-id of 1, 2, and 4 in the first row 308, the second row 310, and the fourth row 314 in the BIFT 300 each have an SI of 0 and each have the same BFR-NBR of network node C, the F-BM for those rows is a combination of the bitstrings of the destination nodes with the BFR-id of 1, 2, and 4. In particular, a logical OR operation is applied to the bitstrings of the destination nodes with the BFR-id of 1, 2, and 4. A logical OR of the bitstrings 00001, 00010, and 01000 results in an F-BM of 01011 in the first row 308, the second row 310, and the fourth row 314 in the BIFT 300.

Because there are no other destination network nodes except for the destination network node E (a.k.a., network node 112) with the BFR-NBR of network node E, the F-BM in the third row 312 of the BIFT 300 is the same as the bitstring of the destination network node E, which is 00100. Likewise, because there are no other destination network nodes except for the destination network node A (a.k.a., network node 104) with the BFR-NBR of network node A, the F-BM in the fifth row 316 of the BIFT 300 is the same as the bitstring of the destination network node A, which is 10000.

FIG. 4 is a schematic diagram of a fast reroute (FRR) BIRT 400 of a network node (e.g., network node 106) according to an embodiment of the disclosure. The FRR BIRT 400 may be referred to herein as a backup BIRT. Each of the network nodes 104-118 in the BIER topology 100 in FIG. 1 builds and maintains a FRR BIRT 400 for each BFR-NBR. Unlike the BIRT 200 of FIG. 2, the BIRT 400 of FIG. 4 is built in anticipation of the failure of a BFR-NBR. As an example, the BIRT 400 depicted in FIG. 4 is the BIRT 400 built by the network node 106 in FIG. 1 in anticipation of the failure of the neighbor node C (a.k.a., the network node 108). The network node 106 would also build a similar FRR BIRT for neighbor nodes G, E, and A.

In an embodiment, the network node 106 starts building the FRR BIRT 400 by copying the BIRT 200 of FIG. 2. Once the BIRT 200 has been copied, the network node 106 replaces the neighbor node C in the FRR-BIRT 400 with one of a plurality of backup BFR-NBRs when the neighbor node C is the next hop for a destination network node in the FRR-BIRT 400. That is, the first column 402 and the second column 404 of the FRR BIRT 400 are the same as the first column 202 and the second column 204 of the BIRT 200 of FIG. 2. However, the third column 406 of the FRR BIRT 400 is updated such that the neighbor node C is replaced with a different next hop for the particular destination. In particular, when network node C has failed, a packet transmitted by network node B must use network node G as a next hop to reach the destination node D. A packet transmitted by network node B must use network node E as a next hop to reach the destination node F when network node C has failed. Likewise, a packet transmitted by network node B must use network node G as a next hop to reach the destination node H when network node C has failed. The rest of column 406 remains unchanged.

In light of the update, a first row 408 in the FRR BIRT 400 indicates that the BFR-NBR (or next hop) on the shortest path to the destination node D is now network node G (instead of network node C). A second row 410 in the FRR BIRT 400 indicates that the BFR-NBR on the shortest path to the destination node F is now network node E (instead of network node C). A third row 412 in the FRR BIRT 400 still indicates that the BFR-NBR on the shortest path to the destination node E is network node E. A fourth row 414 in the FRR BIRT 400 indicates that the BFR-NBR on the shortest path to the destination node H is now network node G (instead of network node C). A fifth row 416 in the FRR BIRT 400 now indicates that the BFR-NBR on the shortest path to the destination node A is still network node A. Notably, the destination network node in the first row 208, the second row 210, and the fourth row 214 in the BIRT 200 each have an SI of 0 and have the same BFR-NBR of network node C.

FIG. 5 is a schematic diagram of a FRR BIFT 500 of a network node according to an embodiment of the disclosure. The FRR BIFT 500 may be referred to herein as a backup BIFT. Each of the network nodes 104-118 in the BIER topology 100 in FIG. 1 derives a FRR BIFT 500 based on the FRR BIRT (e.g., FRR BIRT 400) that the network nodes 104-118 built.

The FRR BIFT 500 depicted in FIG. 5 is the FRR BIFT 500 built on the network node 106 in FIG. 1. As shown, the FRR BIFT 500 includes three columns of information. The first column 502 and the third column 506 in the FRR BIFT 500 are the same as the first column 402 and the third column 406 in the FRR BIRT 400 of FIG. 4. However, a second column 504 includes an F-BM that has been updated as noted below.

Because the destination network nodes with the BFR-id of 1 and 4 in the first row 508 and the fourth row 514 in the FRR BIFT 500 each have an SI of 0 and each have the same BFR-NBR of network node G, the F-BM for those rows is a combination of the bitstrings of the destination nodes with the BFR-id of 1 and 4. In particular, a logical OR operation is applied to the bitstrings of the destination nodes with the BFR-id of 1 and 4. A logical OR of the bitstrings 00001 and 01000 results in an F-BM of 01001 in the first row 508 and the fourth row 514 in the FRR BIFT 500.

Because the destination network nodes with the BFR-id of 2 and 3 in the second row 510 and the third row 512 in the FRR BIFT 500 each have an SI of 0 and each have the same BFR-NBR of network node E, the F-BM for those rows is a combination of the bitstrings of the destination nodes with the BFR-id of 2 and 3. In particular, a logical OR operation is applied to the bitstrings of the destination nodes with the BFR-id of 2 and 3. A logical OR of the bitstrings 00010 and 00100 results in an F-BM of 00110 in the second row 510 and the third row 512 in the FRR BIFT 500.

Because there are no other destination network nodes except for the destination network node A (a.k.a., network node 104) with the BFR-NBR of network node A, the F-BM in the fifth row 516 of the FRR BIFT 500 is the same as the bitstring of the destination network node A, which is 10000. Once the FRR BIFT 500 is derived as discussed above, a packet (e.g., a multicast packet) can be forwarded in accordance with the FRR BIFT 500 when the neighbor node C has failed.

Figure 6:
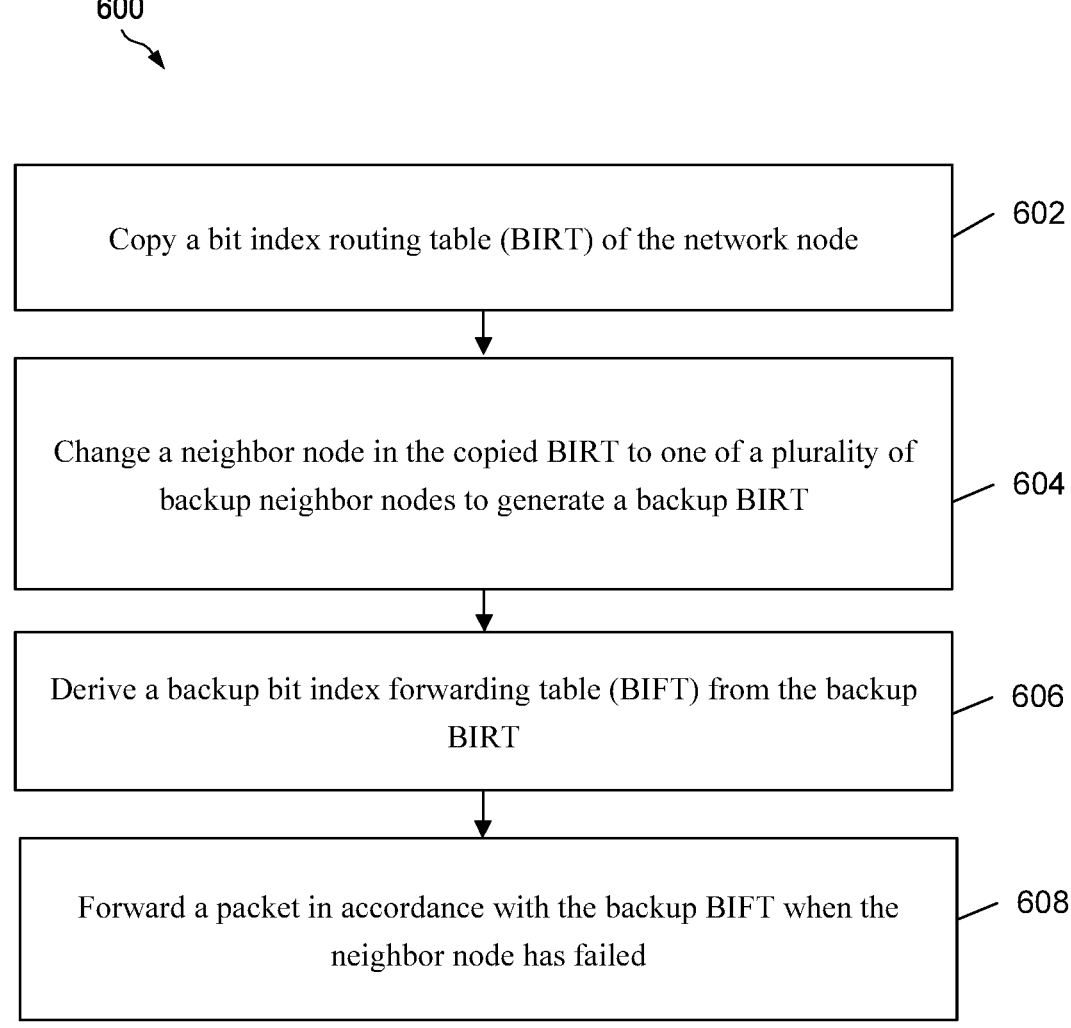
FIG. 6 is a method implemented by a network node in the BIER domain according to an embodiment of the disclosure.

FIG. 6 is a method implemented by a network node in the BIER domain according to an embodiment of the disclosure. The network node may be the network node 106 and the BIER domain may be the BIER domain 102. In block 602, the network node 106 copies a bit index routing table (BIRT) of the network node.

In block 604, the network node 106 changes the neighbor node in the copied BIRT to one of a plurality of backup neighbor nodes to generate a backup BIRT (a.k.a., a FRR-BIRT). In an embodiment, one of a plurality of backup neighbor nodes for the destination network node is a basic loop-free alternate (LFA) bit forwarding router (BFR) for the destination network node. The basic LFA is described in detail in Internet Engineering Task Force (IETF) document Request for Comments (RFC) 5286 entitled "Basic Specification for IP Fast Reroute: Loop-Free Alternates" by A. Atlas, et al., published September 2008. In an embodiment, one of a plurality of backup neighbor nodes for the destination network node is a remote LFA BFR for the destination network node. The remote LFA is described in detail in IETF document RFC 7490 entitled "Remote Loop-Free Alternate (LFA) Fast Reroute (FRR)" by S. Bryant, et al., published April 2015. In an embodiment, the one of a plurality of backup neighbor nodes for the destination network node is a topology independent (TI) LFA BFR for the destination network node. The TI LFA is described in detail in IETF document entitled "Topology Independent Fast Reroute using Segment Routing" by S. Litkowski, et al., published June 2021.

In block 606, the network node 106 derives a backup bit index forwarding table (BIFT) from the backup BIRT. In an embodiment, deriving the backup BIFT comprises generating a F-BM for each destination network node in the backup BIFT using a bitstring of each destination BFR from the backup BIRT. In an embodiment, deriving the backup BIFT comprises generating a F-BM for two or more of the destination network nodes sharing a same next hop in the backup BIRT by applying a logical OR operation to bitstrings of the two or more destination network nodes.

In block 608, the network node 106 forwards a packet in accordance with the backup BIFT when the neighbor node has failed. In an embodiment, the network node 106 detecting that the neighbor node has failed after the backup BIFT has been derived. That is, the backup BIFT is already built on the network node 106 prior to any failure being detected.

Figure 7:
FIG. 7 is a schematic diagram of a network apparatus according to an embodiment of the disclosure.
Figure 7:
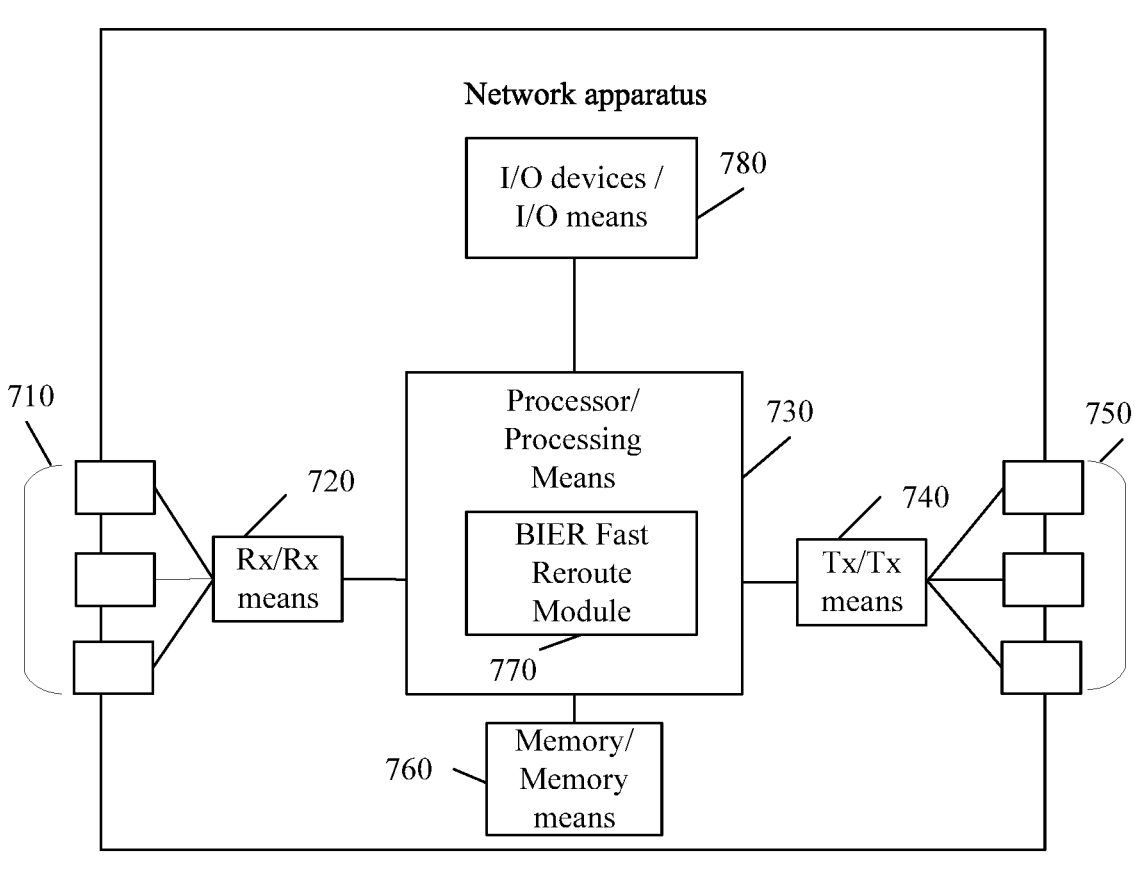

FIG. 7 is a schematic diagram of a network apparatus 700 (e.g., a network node, a destination node, a neighbor node, etc.). The network apparatus 700 is suitable for implementing the disclosed embodiments as described herein. The network apparatus 700 comprises ingress ports/ingress means 710 and receiver units (Rx)/receiving means 720 for receiving data; a processor, logic unit, or central processing unit (CPU)/processing means 730 to process the data; transmitter units (Tx)/transmitting means 740 and egress ports/ egress means 750 for transmitting the data; and a memory/ memory means 760 for storing the data. The network apparatus 700 may also comprise optical-to-electrical (OE) components and electrical-to-optical (EO) components coupled to the ingress ports/ingress means 710, the receiver units/receiving means 720, the transmitter units/transmitting means 740, and the egress ports/egress means 750 for egress or ingress of optical or electrical signals.

The processor/processing means 730 is implemented by hardware and software. The processor/processing means 730 may be implemented as one or more CPU chips, cores (e.g., as a multi-core processor), field-programmable gate arrays (FPGAs), application specific integrated circuits (ASICs), and digital signal processors (DSPs). The processor/processing means 730 is in communication with the ingress ports/ingress means 710, receiver units/receiving means 720, transmitter units/transmitting means 740, egress ports/egress means 750, and memory/memory means 760. The processor/processing means 730 comprises a BIER fast reroute module 770. The BIER fast reroute module 770 is able to implement the methods disclosed herein. The inclusion of the BIER fast reroute module 770 therefore provides a substantial improvement to the functionality of the network apparatus 700 and effects a transformation of the network apparatus 700 to a different state. Alternatively, the BIER fast reroute module 770 is implemented as instructions stored in the memory/memory means 760 and executed by the processor/processing means 730.

The network apparatus 700 may also include input and/or output (I/O) or devices/I/O means 780 for communicating data to and from a user. The I/O devices or I/O means 780 may include output devices such as a display for displaying video data, speakers for outputting audio data, etc. The I/O devices or I/O means 780 may also include input devices, such as a keyboard, mouse, trackball, etc., and/or corresponding interfaces for interacting with such output devices.

The memory/memory means 760 comprises one or more disks, tape drives, and solid-state drives and may be used as an over-flow data storage device, to store programs when such programs are selected for execution, and to store instructions and data that are read during program execution. The memory/memory means 760 may be volatile and/or non-volatile and may be read-only memory (ROM), random access memory (RAM), ternary content-addressable memory (TCAM), and/or static random-access memory (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a network node in a Bit Index Explicit Replication (BIER) domain, comprising:

copying a bit index routing table (BIRT) of the network node;

changing a neighbor node in the copied BIRT to one of a plurality of backup neighbor nodes to generate a backup BIRT;

deriving a backup bit index forwarding table (BIFT) from the backup BIRT; and forwarding a packet in accordance with the backup BIFT when the neighbor node has failed.

2. The method of claim 1, wherein the one of the plurality of backup neighbor nodes is a basic loop-free alternate (LFA) bit forwarding router (BFR).

3. The method of claim 1, wherein the one of the plurality of backup neighbor nodes is a remote loop-free alternate (LFA) bit forwarding router (BFR).

4. The method of claim 1, wherein the one of the plurality of backup neighbor nodes is a topology independent loop-free alternate (LFA) bit forwarding router (BFR).

5. The method of claim 1, wherein deriving the backup BIFT comprises generating a forwarding bit mask (F-BM) for each destination network node in the backup BIFT using a bitstring of each destination bit forwarding router (BFR) from the backup BIRT.

6. The method of claim 1, wherein deriving the backup BIFT comprises generating a forwarding bit mask (F-BM) for two or more destination network nodes sharing a same next hop in the backup BIRT by applying a logical OR operation to bitstrings of the two or more destination network nodes.

7. The method of claim 1, wherein a forwarding bit mask (F-BM) in the backup BIFT is used when the packet is forwarded in accordance with the backup BIFT.

8. The method of claim 1, further comprising detecting that the neighbor node has failed after the backup BIFT has been derived.

9. The method of claim 1, wherein a destination network node in the backup BIRT is represented by a bit forwarding router identifier (BFR-id), a set index, and a bitstring.

10. The method of claim 1, wherein the network node is a bit forwarding router (BFR), and wherein the neighbor node is a bit forwarding router neighbor (BFR-NBR).

11. The method of claim 1, further comprising replacing the neighbor node in the backup BIRT with one of the plurality of backup neighbor nodes for a destination network node when the neighbor node is a next hop for the destination network node in the backup BIRT, and wherein the destination network node is a bit forwarding egress router (BFER).

12. A network node in a Bit Index Explicit Replication (BIER) domain, comprising:

a memory storing instructions; and one or more processors coupled to the memory, wherein the one or more processors are configured to execute the instructions to cause the network node to:

copy a bit index routing table (BIRT) of the network node;

change a neighbor node in the copied BIRT to one of a plurality of backup neighbor nodes to generate a backup BIRT;

derive a backup bit index forwarding table (BIFT) from the backup BIRT; and forward a packet in accordance with the backup BIFT when the neighbor node has failed.

13. The network node of claim 12, wherein the one of the plurality of backup neighbor nodes is a basic loop-free alternate (LFA) bit forwarding router (BFR).

14. The network node of claim 12, wherein the one of the plurality of backup neighbor nodes is a remote loop-free alternate (LFA) bit forwarding router (BFR).

15. The network node of claim 12, wherein the one of the plurality of backup neighbor nodes is a topology independent loop-free alternate (LFA) bit forwarding router (BFR).

16. The network node of claim 12, wherein to derive the backup BIFT the one or more processors are configured to execute the instructions to cause the network node to generate a forwarding bit mask (F-BM) for each destination network node in the backup BIFT using a bitstring of each destination bit forwarding router (BFR) from the backup BIRT to derive the backup BIFT.

17. The network node of claim 12, wherein to derive the backup BIFT the one or more processors are configured to execute the instructions to cause the network node to generate a forwarding bit mask (F-BM) for two or more destination network nodes sharing a same next hop in the backup BIRT by applying a logical OR operation to bitstrings of the two or more destination network nodes.

18. The network node of claim 12, wherein the network node is a bit forwarding router (BFR) and the neighbor node is a bit forwarding router neighbor (BFR-NBR).

19. The network node of claim 12, wherein the instructions further cause the network node to replace the neighbor node in the backup BIRT with one of the plurality of backup neighbor nodes for a destination network node when the neighbor node is a next hop for the destination network node in the backup BIRT, and wherein the destination network node is a bit forwarding egress router (BFER).

20. The network node of claim 12, wherein the one or more processors are configured to execute the instructions to cause the network node to detect that the neighbor node has failed after the backup BIFT has been derived.

21. The network node of claim 12, wherein a destination network node in the backup BIRT is represented by a bit forwarding router identifier (BFR-id), a set index, and a bitstring.

* * * * *